(12) United States Patent
Uchino et al.

(10) Patent No.: US 11,106,300 B2
(45) Date of Patent: Aug. 31, 2021

(54) DISPLAY DEVICE

(71) Applicant: Japan Display Inc., Minato-ku (JP)

(72) Inventors: Satoshi Uchino, Minato-ku (JP); Kohei Azumi, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 35 days.

(21) Appl. No.: 16/535,465

(22) Filed: Aug. 8, 2019

(65) Prior Publication Data

US 2021/0041975 A1  Feb. 11, 2021

(51) Int. Cl.
*G06F 3/041* (2006.01)
*G06F 3/044* (2006.01)
*G06F 3/046* (2006.01)

(52) U.S. Cl.
CPC ............ *G06F 3/0412* (2013.01); *G06F 3/044* (2013.01); *G06F 3/046* (2013.01); *G06F 3/04166* (2019.05); *G06F 2203/04106* (2013.01)

(58) Field of Classification Search
None
See application file for complete search history.

(56) References Cited

U.S. PATENT DOCUMENTS

| 5,404,151 A * | 4/1995 | Asada ................. G09G 3/3674 326/113 |
| 2015/0277651 A1* | 10/2015 | Zhang ..................... G06F 3/041 345/173 |

FOREIGN PATENT DOCUMENTS

JP           10-49301 A      2/1998

* cited by examiner

*Primary Examiner* — Brian M Butcher
(74) *Attorney, Agent, or Firm* — Oblon, McClelland, Maier & Neustadt, L.L.P.

(57) ABSTRACT

A display device according to an aspect of the present invention includes a display panel, a driver IC configured to perform image display on the display panel, and a plurality of touch ICs. One of the touch ICs is configured to be driven based on a synchronization signal that is output from the driver IC, and output a synchronization signal for another touch IC. The other touch IC is configured to be driven based on a synchronization signal that is output from the one touch IC.

18 Claims, 10 Drawing Sheets

DISPLAY DEVICE

BACKGROUND

1. Technical Field

The present invention relates to a display device.

2. Description of the Related Art

Recently, touch detection devices called touch panels, which are capable of detecting an external proximate object, have been attracting attention. Such a touch panel is mounted on or integrated with a display device such as a liquid crystal display device, and is used as a display device equipped with a touch detection device. Known methods of such external proximate object detection include a capacitive method and an electromagnetic induction method. In the electromagnetic induction method, the display device is provided with a coil configured to generate a magnetic field and a coil configured to detect a magnetic field. A pen as an external object is provided with a coil and a capacitor element forming a resonance circuit. The display device detects the pen based on electromagnetic induction between each coil of the display device and the coil in the pen. Patent Literature 1 below discloses a coordinate input device of the electromagnetic induction method.

A display device equipped with a touch detection device can employ a plurality of touch detection methods for detecting different detection targets. For example, the capacitive method and the electromagnetic induction method have greatly different detection targets and detection electrode configurations from each other. In this case, a touch IC that achieves touch detection is typically provided for each detection method. Further, it is possible that a touch detection region is divided into a plurality of regions, that a touch detection method of the same kind is employed for each divided region, and that a touch IC is provided for each region. In a configuration in which a plurality of touch ICs are provided in this manner, communication between a driver IC and each touch IC is typically performed on a one-on-one basis, which potentially leads to an increase of the number of wiring lines such as control lines and complication of control of the driver IC.

For the foregoing reasons, there is a need for a display device that can prevent an increase of the number of wiring lines and complication of control due to mounting of a plurality of touch ICs.

SUMMARY

A display device according to an aspect of the present invention includes a display panel, a driver IC configured to perform image display on the display panel, and a plurality of touch ICs; one of the touch ICs is configured to be driven based on a synchronization signal that is output from the driver IC, and output a synchronization signal for another touch IC; and the other touch IC is configured to be driven based on a synchronization signal that is output from the one touch IC.

A display device according to another aspect of the present invention includes a display panel, a driver IC configured to perform image display on the display panel, and at least a first detection circuit, a second detection circuit, and a third detection circuit; the first detection circuit is configured to be driven based on a synchronization signal that is output from the driver IC, and output respective synchronization signals for the second detection circuit and the third detection circuit; and the second detection circuit and the third detection circuit are configured to be driven based on the respective synchronization signals that are output from the first detection circuit.

DETAILED DESCRIPTION

Modes (embodiments) for carrying out the present invention will be described below in detail with reference to the accompanying drawings. The present invention is not limited by the contents of the following description of the embodiments. Components described below include those easily thought of a skilled person in the art and those identical in effect. Moreover, configurations described below may be combined as appropriate. What is disclosed herein is merely exemplary, and any modification that can be easily thought of by the skilled person in the art as appropriate without departing from the gist of the invention is included in the scope of the present invention. For further clarity of description, each drawing schematically illustrates the width, thickness, shape, and the like of each component as compared to those in the actual configuration in some cases, but the illustration is merely exemplary and does not limit interpretation of the present invention. In the present specification and the drawings, any element similar to that described with reference to a drawing already described is denoted by an identical reference sign, and detailed description thereof is omitted as appropriate in some cases.

First Embodiment

Figure 1:
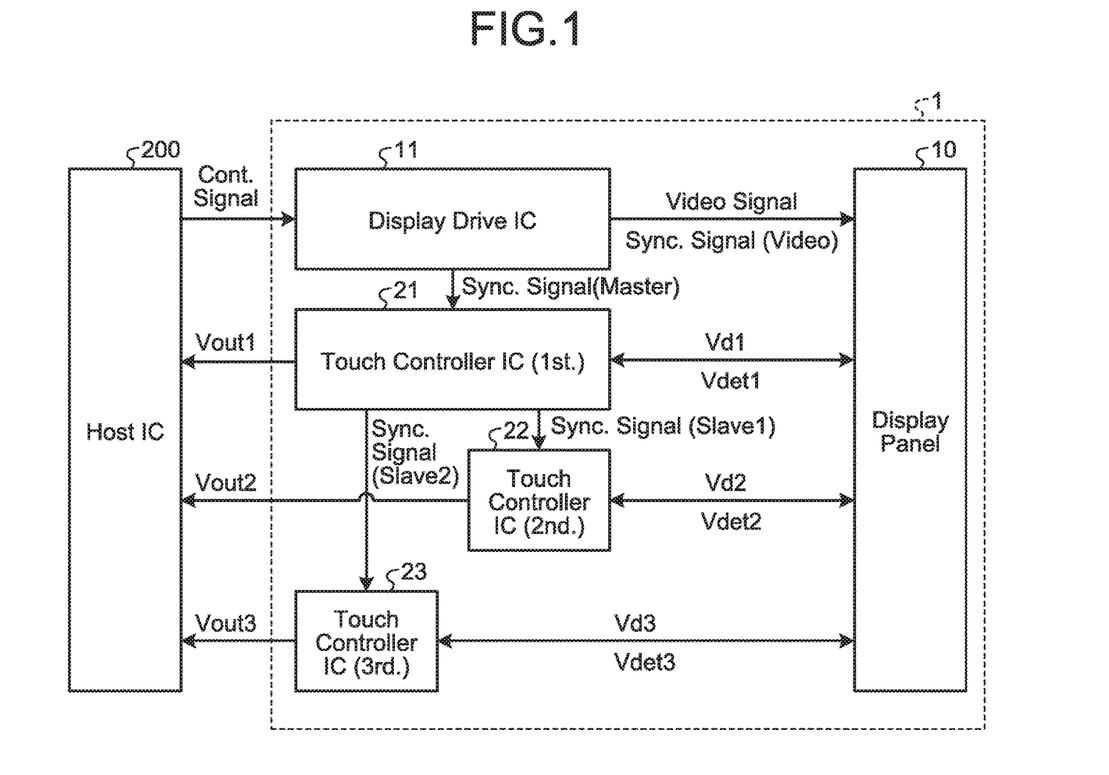
FIG. 1 is a block diagram illustrating a schematic configuration of a display device according to a first embodiment.

FIG. 1 is a block diagram illustrating a schematic configuration of a display device according to a first embodiment. As illustrated in FIG. 1, this display device 1 includes a display panel 10, a driver IC 11, a first touch IC 21, a second touch IC 22, and a third touch IC 23.

The display panel 10 is, for example, a liquid crystal display panel in which liquid crystal is used as a display element. In the embodiment, the display panel 10 is not limited to a liquid crystal display panel. For example, the display panel 10 may be an organic EL panel in which an organic light emitting diode (OLED) is used as the display element. Alternatively, the display panel 10 may be an inorganic EL panel in which an inorganic light emitting diode (micro LED) is used as the display element.

The display panel 10 includes a plurality of pixels each including the display element and also includes a display surface facing the pixels. The display panel 10 displays an image formed by pixels on the display surface based on an image signal or a display synchronization signal input from the driver IC 11.

In the present embodiment, the display panel 10 is a display panel that has a touch detection function and employs a plurality of touch detection methods of detecting contact with or proximity to the display surface by a detection target or force on the display surface applied by a detection target. The display panel 10 receives inputting of a detection drive signal from each of the first touch IC 21, the second touch IC 22, and the third touch IC 23, and outputs a detection signal in accordance with a detection result.

The display panel 10 may be, for example, what is called an on-cell display panel on which touch sensors for respective touch detection methods are mounted. The display panel 10 may have a configuration in which, for example, touch sensors for respective touch detection methods are integrated. The configuration of the display panel 10 in which touch sensors are incorporated and integrated includes, for example, a configuration in which some members such as a substrate and an electrode used for display double as some members such as a substrate and an electrode used as touch sensors. The present disclosure is not limited by the embodiment of the display panel 10.

The driver IC 11 generates and outputs, based on a control signal that is output from a host IC 200, an image signal and a display synchronization signal for performing image display on the display panel 10. In addition, the driver IC 11 outputs, to the first touch IC 21, a detection control signal for detecting contact with and proximity to the display surface of the display panel 10 by a detection target.

In the present embodiment, the first touch IC 21 is, for example, a circuit configured to perform electromagnetic-induction touch detection. The first touch IC 21 outputs a drive signal Vd1 to a transmission electrode provided in the display panel 10. In addition, the first touch IC 21 performs electromagnetic-induction touch detection based on a detection signal Vdet1 output from a reception electrode provided in the display panel 10, and outputs an output signal Vout1 as a result of the detection. In the present disclosure, the first touch IC 21 corresponds to a first detection circuit.

In the present embodiment, the second touch IC 22 is, for example, a circuit configured to perform self-capacitive touch detection. The second touch IC 22 outputs a drive signal Vd2 to a detection electrode provided in the display panel 10, performs self-capacitive touch detection based on a detection signal Vdet2 output from the detection electrode, and outputs an output signal Vout2 as a result of the detection. In the present disclosure, the second touch IC 22 corresponds to a second detection circuit.

In the present embodiment, the third touch IC 23 is, for example, a circuit configured to perform mutual capacitive touch detection. The third touch IC 23 outputs a drive signal Vd3 to a drive electrode provided in the display panel 10. In addition, the third touch IC 23 performs mutual capacitive touch detection based on a detection signal Vdet3 output from the detection electrode provided in the display panel 10, and outputs the output signal Vout1 as a result of the detection. In the present disclosure, the third touch IC 23 corresponds to a third detection circuit.

In the present embodiment, the first touch IC 21 operates as a master device at the detection timing of the second touch IC 22 and the third touch IC 23. In other words, the detection timing of the second touch IC 22 and the third touch IC 23 are controlled by the first touch IC 21. Thus, at the detection timing, the second touch IC 22 and the third touch IC 23 operate as slave devices of the first touch IC 21.

The transmission electrode for the first touch IC 21 may serve as a drive electrode for the second touch IC 22 and/or the third touch IC 23. In addition, the reception electrode for the first touch IC 21 may serve as the drive electrode for the second touch IC 22 and/or the detection electrode for the third touch IC 23. In addition, the transmission electrode and the reception electrode for the first touch IC 21, the drive electrode for the second touch IC 22, and the drive electrode and the detection electrode for the third touch IC 23 may serve as various electrodes used when display operations are performed on the display panel 10. The present disclosure is not limited by the embodiments of the electrodes.

The first touch IC 21 may perform self-capacitive or mutual capacitive touch detection, the second touch IC 22 may perform electromagnetic induction or mutual capacitive touch detection, and the third touch IC 23 may perform electromagnetic induction or self-capacitive touch detection. The present disclosure is not limited by the embodiments of the touch detection methods of the first touch IC 21, the second touch IC 22, and the third touch IC 23.

Figure 2:
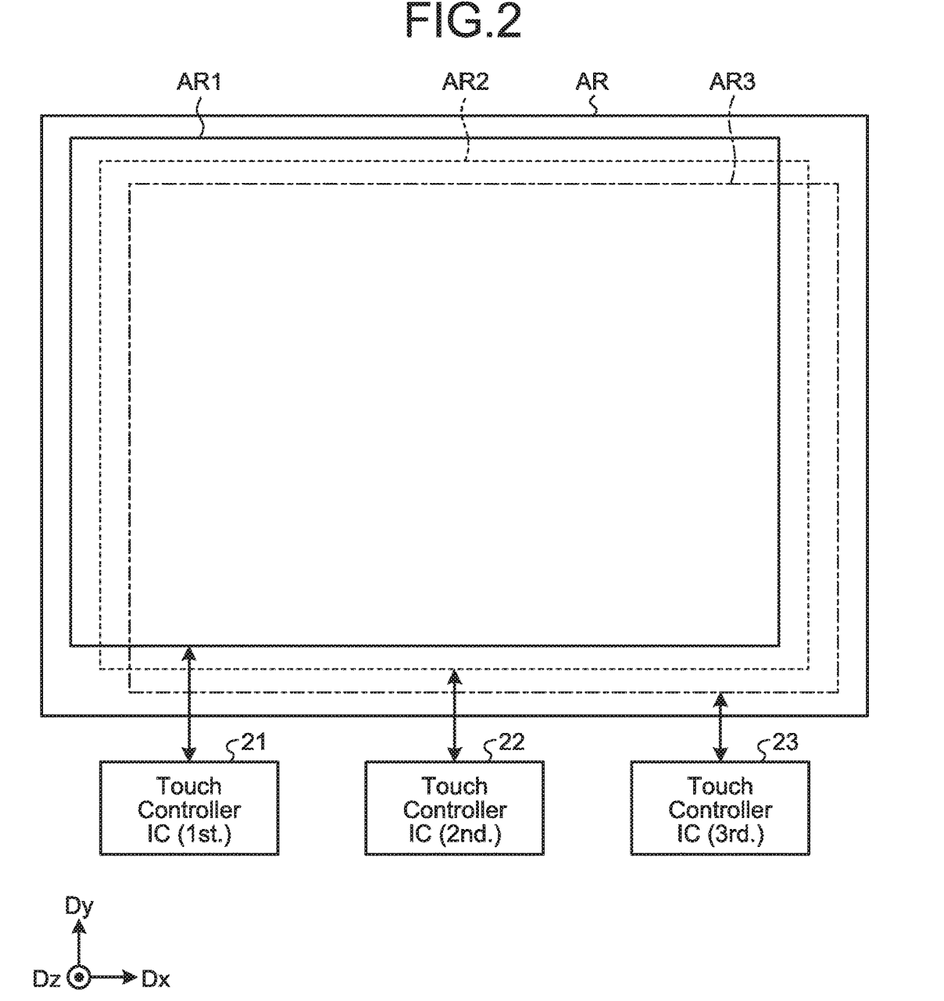
FIG. 2 is a pattern diagram illustrating the detection regions of respective touch ICs in the display device according to the first embodiment.

FIG. 2 is a pattern diagram illustrating the detection regions of respective touch ICs in the display device according to the first embodiment. In the present embodiment, as illustrated in FIG. 2, a detection region AR1 of the first touch IC 21, a detection region AR2 of the second touch IC 22, and a detection region AR3 of the third touch IC 23 each entirely overlap with a display region AR for display operations. Thus, in the present embodiment, the first touch IC 21, the second touch IC 22, and the third touch IC 23 perform touch detection operations by touch detection methods different from each other in the respective detection regions AR1, AR2, and AR3 identical to each other and overlapping the display region AR. In other words, the first touch IC 21, the second touch IC 22, and the third touch IC 23 perform touch detection operations in the display region AR as one detection region AR1, AR2, or AR3.

Figure 3:
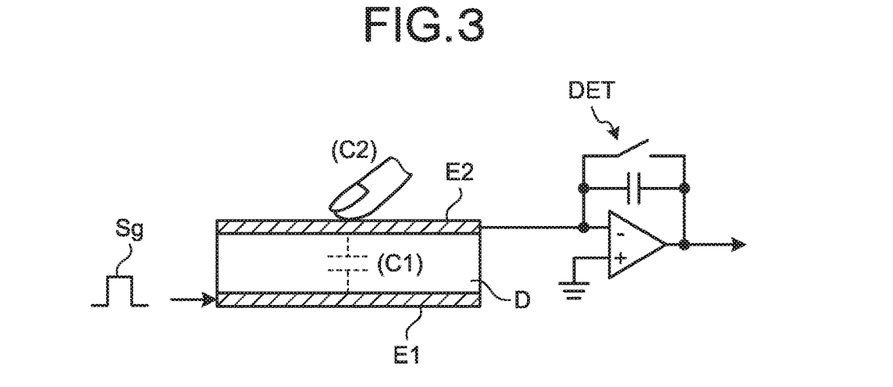
FIG. 3 is an explanatory diagram for description of the fundamental principle of mutual capacitive touch detection.

The following describes the fundamental principle of mutual capacitive touch detection, as a kind of capacitive touch detection, performed by the display device 1 according to the present embodiment with reference to FIG. 3. FIG. 3 is an explanatory diagram for description of the fundamental principle of mutual capacitive touch detection. FIG. 3 also illustrates a detection circuit. The following description will be made on a case of contact by or proximity of a finger as a detection target, but the detection target is not limited to a finger and may be, for example, a stylus pen.

For example, as illustrated in FIG. 3, a capacitor element C1 includes a pair of electrodes, namely a drive electrode E1 and a detection electrode E2, disposed opposite to each other with a dielectric D interposed therebetween. At the capacitor element C1, fringe components of lines of electric force extending from ends of the drive electrode E1 toward the upper surface of the detection electrode E2 are generated in addition to lines of electric force formed between opposite surfaces of the drive electrode E1 and the detection electrode E2. The capacitor element C1 has one end coupled with an alternating-current signal source, and the other end coupled with a voltage detector DET. The voltage detector DET is included in, for example, the third touch IC 23 illustrated in FIG. 1.

Alternating-current square wave Sg having a predetermined frequency (for example, several kHz to several hundred kHz) is applied from the alternating-current signal source to the drive electrode E1 (one end of the capacitor element C1). In a non-contact state, current depending on the capacitance value of the capacitor element C1 flows to the voltage detector DET. The voltage detector DET converts variation of the current depending on the alternating-current square wave Sg into variation of voltage.

In a contact state, as illustrated in FIG. 3, a capacitor C2 formed by a finger contacts the detection electrode E2 or is in proximity to the detection electrode E2 to such an extent that the proximity can be regarded as contact. In this state, the fringe components of lines of electric force between the drive electrode E1 and the detection electrode E2 are interrupted by the finger. This causes the capacitor element C1 to act as a capacitor element having a capacitance value less than that in the non-contact state.

The amplitude of a voltage signal that is output from the voltage detector DET in the contact state is less than that in the non-contact state. The absolute value $|\Delta V|$ of the difference of the voltage signal changes with the existence of a detection target. The third touch IC 23 determines whether the detection target is in the non-contact state or in the contact or proximity state by comparing the absolute value $|\Delta V|$ to a predetermined threshold voltage.

Figure 4:
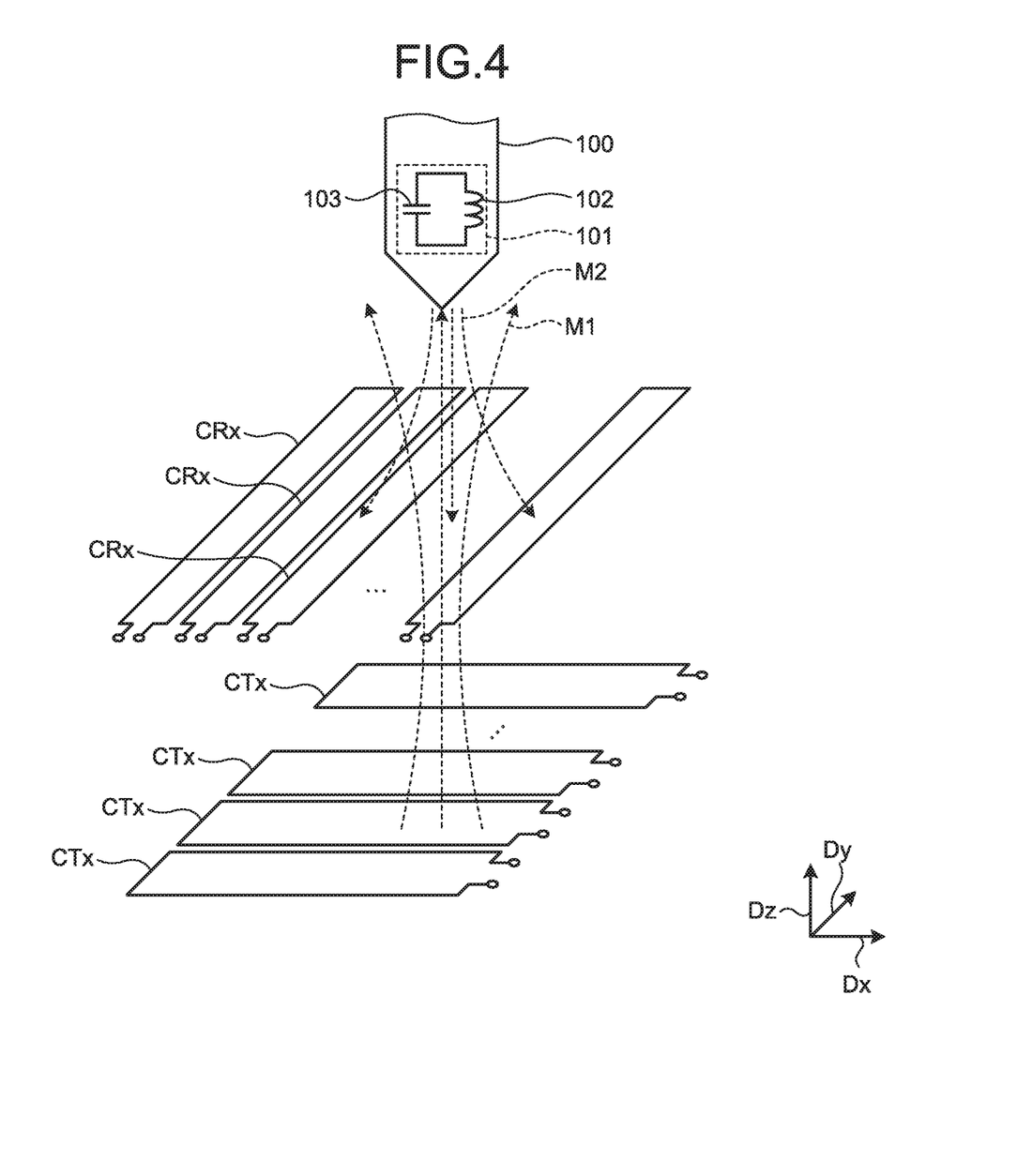
FIG. 4 is an explanatory diagram for description of electromagnetic-induction touch detection.

The following describes electromagnetic induction touch detection performed by the display device 1 according to the present embodiment with reference to FIG. 4. FIG. 4 is an explanatory diagram for description of electromagnetic-induction touch detection.

As illustrated in FIG. 4, in electromagnetic induction touch detection, contact by or proximity of a touch pen 100 is detected. A resonance circuit 101 is provided inside the touch pen 100. In the resonance circuit 101, a coil 102 and a capacitor element 103 are coupled in parallel with each other.

In a magnetic field generation period, a drive signal (alternating-current square wave) having a predetermined frequency (for example, several kHz to several hundred kHz) is applied from the first touch IC 21 to a transmission electrode CTx. This causes current to flow through the transmission electrode CTx, and thus the transmission electrode CTx generates a magnetic field M1 in accordance with this current change. In a case of contact by or proximity of the touch pen 100, electromotive force due to mutual induction between the transmission electrode CTx and the coil 102 is generated at the coil 102. Thus, the capacitor element 103 is charged.

In a magnetic field detection period following the magnetic field generation period, the coil 102 of the touch pen 100 generates a magnetic field M2 that changes in accordance with the resonance frequency of the resonance circuit 101. As the magnetic field M2 passes through a reception electrode CRx, electromotive force due to mutual induction between the reception electrode CRx and the coil 102 is generated at the reception electrode CRx. Current depending on the electromotive force of the reception electrode CRx flows to the first touch IC 21. Detection of the touch pen 100 is performed by sequentially scanning the transmission electrodes CTx.

Figure 5:
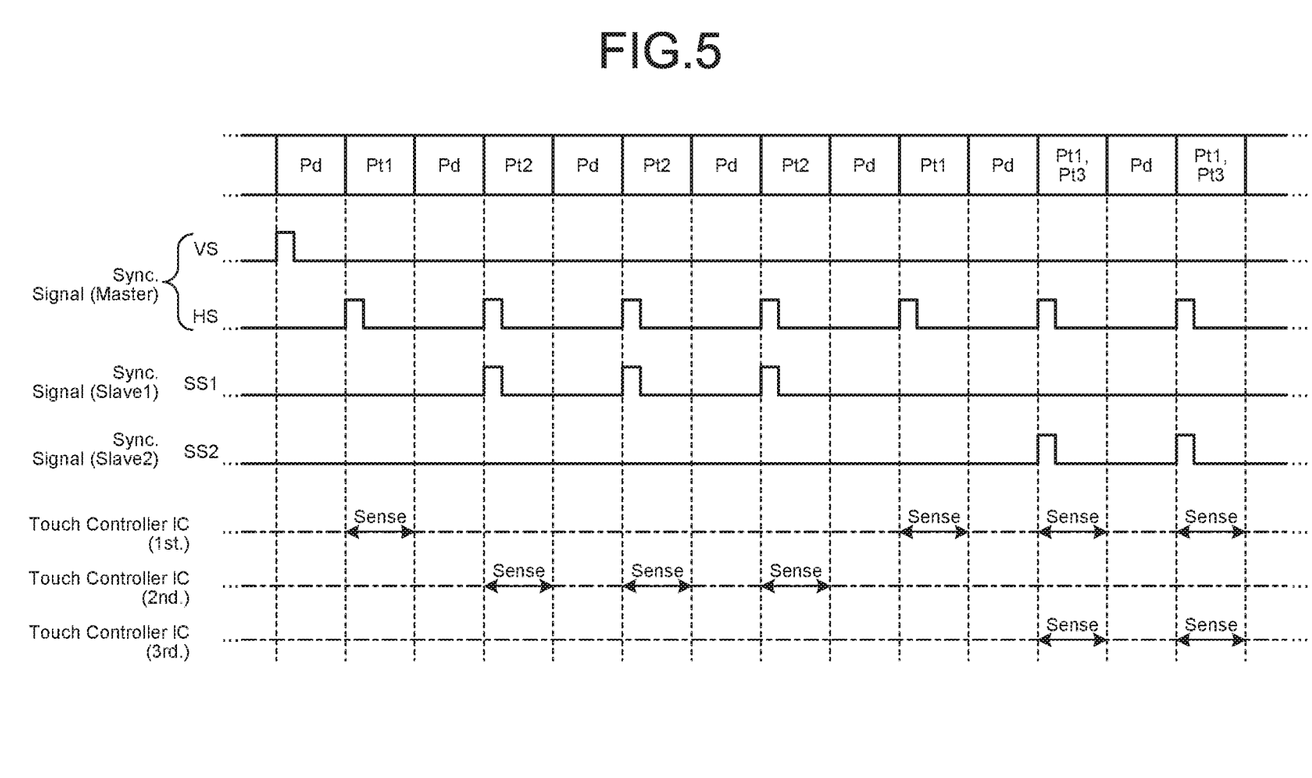
FIG. 5 is a timing chart illustrating an exemplary operation period of the display device according to the first embodiment.

The following describes operations performed by the display device 1 according to the present embodiment with reference to FIGS. 1 and 5. FIG. 5 is a timing chart illustrating an exemplary operation period of the display device according to the first embodiment.

In the present embodiment, as illustrated in FIG. 5, a display period Pd in which a display operation is performed, a detection period Pt1 in which the first touch IC 21 performs a touch detection operation, a detection period Pt2 in which the second touch IC 22 performs a touch detection operation, and a detection period Pt3 in which the third touch IC 23 performs a touch detection operation, are provided in a time divisional manner.

For example, vertical synchronization signals VS and horizontal synchronization signals HS in display operations are input from the driver IC 11 to the first touch IC 21 as detection control signals (Sync. Signal (Master) illustrated in FIG. 1) for the first touch IC 21, the second touch IC 22, and the third touch IC 23 (refer to FIG. 5).

In the present embodiment, each of the first touch IC 21, the second touch IC 22, and the third touch IC 23 performs a detection operation when triggered by the synchronization signal for the IC. That is, the first touch IC 21, the second touch IC 22, and the third touch IC 23 operate in synchronization with the driver IC 11.

In the example illustrated in FIG. 5, the first touch IC 21 holds detection timings of the first touch IC 21, the second touch IC 22, and the third touch IC 23 in one frame period in display operations, in other words, in one cycle of the vertical synchronization signal VS.

The first touch IC 21 performs a detection operation in the detection period Pt1 as the detection timing.

In addition, the first touch IC 21 outputs a control signal for controlling operation of the second touch IC 22. Specifically, the first touch IC 21 outputs, to the second touch IC 22, a synchronization signal SS1 (Sync. Signal (Slave1) illustrated in FIG. 1) indicating the detection timing of the second touch IC 22. The second touch IC 22 performs a detection operation based on the synchronization signal SS1 in the detection period Pt2 as the detection timing thereof.

In addition, the first touch IC 21 outputs a control signal for controlling operation of the third touch IC 23. Specifically, the first touch IC 21 outputs, to the third touch IC 23, a synchronization signal SS2 (Sync. Signal (Slave2) illustrated in FIG. 1) indicating the detection timing of the third touch IC 23. The third touch IC 23 performs a detection operation based on the synchronization signal SS2 in the detection period Pt3 as the detection timing thereof.

Figure 6:
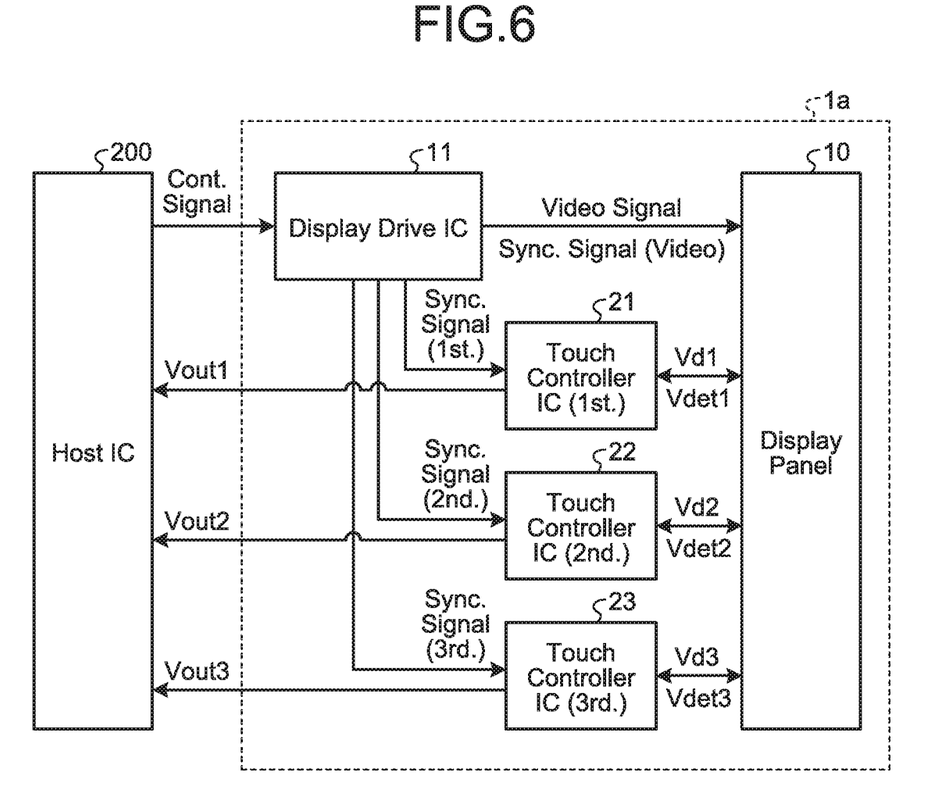
FIG. 6 is a block diagram illustrating a schematic configuration of a display device according to a comparative example.

FIG. 6 is a block diagram illustrating a schematic configuration of a display device according to a comparative example.

In the configuration of this display device 1a according to the comparative example illustrated in FIG. 6, the driver IC 11 holds the detection timings of the first touch IC 21, the second touch IC 22, and the third touch IC 23, and outputs detection synchronization signals (Sync. Signal (1st.), Sync. Signal (2nd.), and Sync. Signal (3rd.)) to the first touch IC 21, the second touch IC 22, and the third touch IC 23, respectively. Thus, in the configuration of the comparative example illustrated in FIG. 6, the driver IC 11 controls the detection timings of the first touch IC 21, the second touch IC 22, and the third touch IC 23.

In the configuration of the display device 1 according to the present embodiment, as described above, the first touch IC 21 holds the detection timings of the first touch IC 21, the second touch IC 22, and the third touch IC 23, and outputs the detection synchronization signals (Sync. Signal (Slave1) and Sync. Signal (Slave2)) to the second touch IC 22 and the third touch IC 23, respectively. Thus, in the configuration of the present embodiment, the first touch IC 21 controls the detection timings of the first touch IC 21, the second touch IC 22, and the third touch IC 23.

With this configuration, the number of wiring lines of the driver IC 11 can be reduced as compared to that of the configuration according to the comparative example illustrated in FIG. 6. In addition, touch detection control performed by the driver IC 11 can be simplified.

(Modification)

Figure 7:
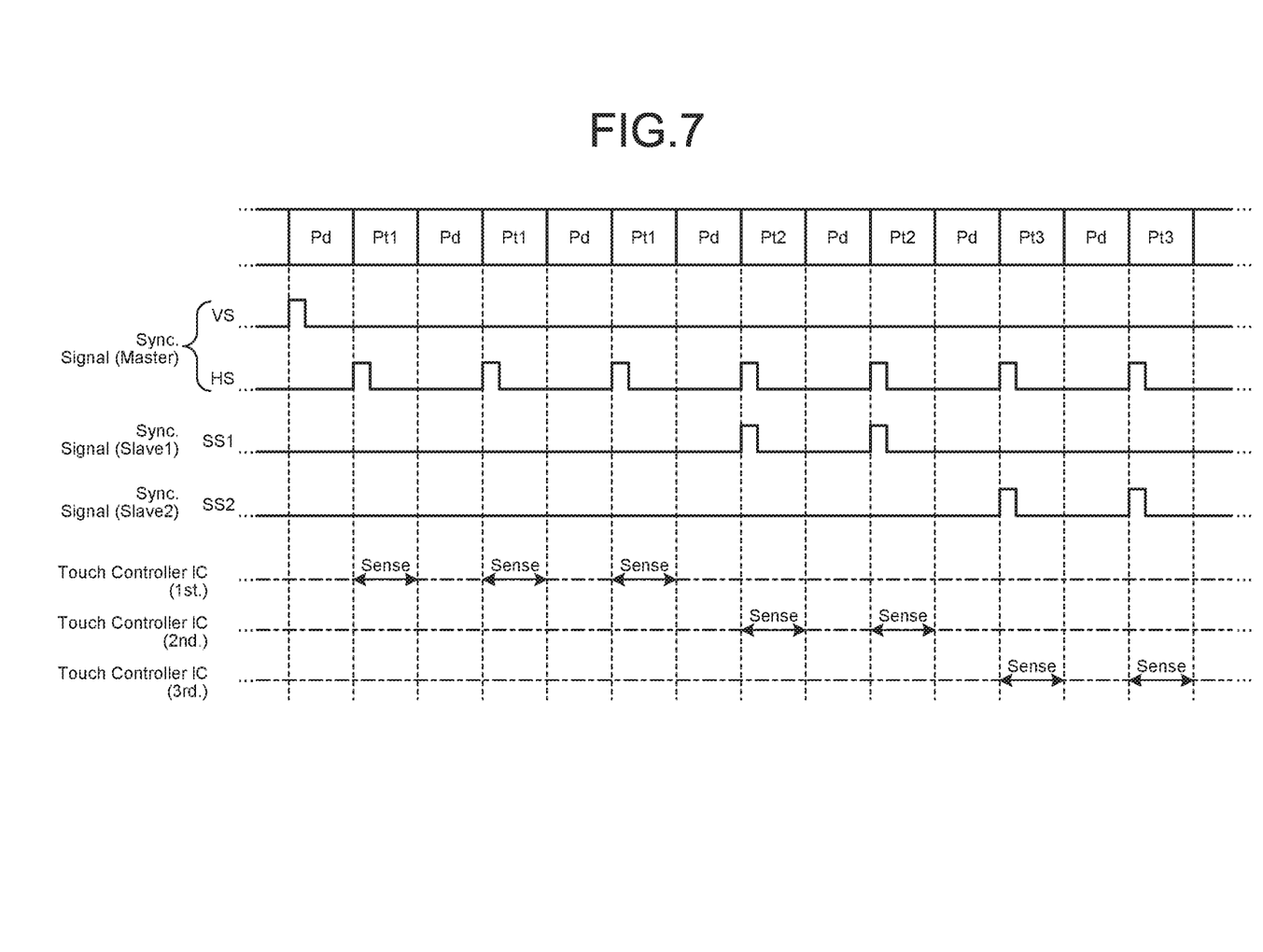
FIG. 7 is a timing chart illustrating an exemplary operation period of a display device according to a modification of the first embodiment.

FIG. 7 is a timing chart illustrating an exemplary operation period of a display device according to a modification of the first embodiment.

In the modification of the first embodiment, any of one or both of the second touch IC 22 and the third touch IC 23 perform touch detection operations based on a result of detection by the first touch IC 21.

Specifically, for example, in the detection period Pt1 illustrated in FIG. 7, when having detected contact with or proximity to the display surface by a detection target, the first touch IC 21 outputs the detection synchronization signal SS1 to the second touch IC 22. In addition, the first touch IC 21 outputs the detection synchronization signal SS2 to the third touch IC 23.

In this manner, for example, with the configuration in which the first touch IC 21 performs self-capacitive touch detection and the second touch IC 22 performs mutual capacitive touch detection, coordinates at which the contact by or proximity of a finger is detected can be obtained by performing the mutual capacitive touch detection by the second touch IC 22 only when contact with or proximity to the display surface by the detection target has been detected in the self-capacitive touch detection by the first touch IC 21.

For example, with the configuration in which the first touch IC 21 performs self-capacitive touch detection and the third touch IC 23 performs electromagnetic-induction touch detection, a touch pen in contact with or proximity to the display surface can be detected by performing the electromagnetic-induction touch detection by the third touch IC 23 only when contact with or proximity to the display surface by the detection target has been detected in the self-capacitive touch detection by the first touch IC 21.

Figure 8:
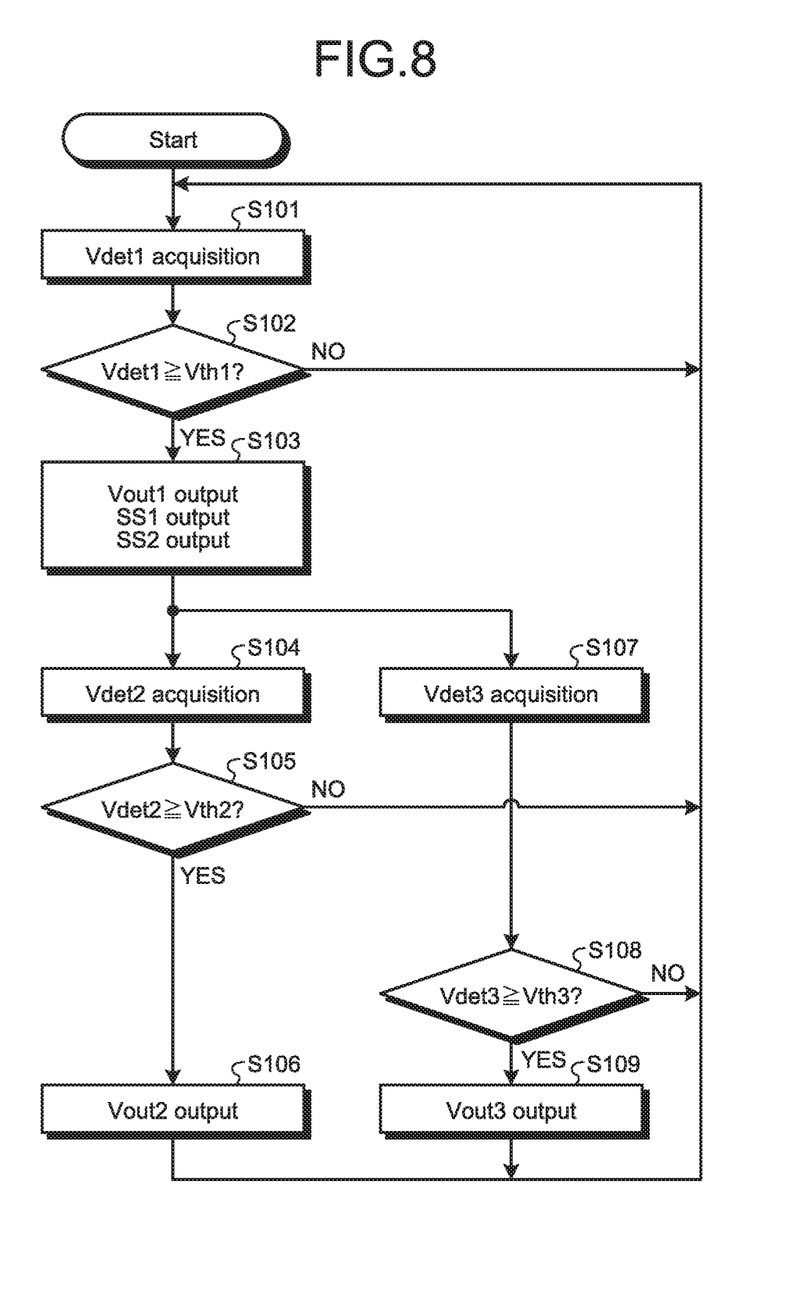
FIG. 8 is a flowchart illustrating exemplary processing performed by the display device according to the modification of the first embodiment.

The following describes processing according to the modification of the first embodiment with reference to FIGS. 7 and 8. FIG. 8 is a flowchart illustrating exemplary processing performed by the display device according to the modification of the first embodiment.

In the example illustrated in FIG. 8, the first touch IC 21 performs self-capacitive touch detection, the second touch IC 22 performs mutual capacitive touch detection, and the third touch IC 23 performs electromagnetic-induction touch detection.

First, the first touch IC 21 performs a self-capacitive touch detection operation. The first touch IC 21 acquires the detection signal Vdet1 (step S101), and determines whether the detection signal Vdet1 is equal to or greater than a predetermined first threshold Vth1 (Vdet1≥Vth1) (step S102).

When the detection signal Vdet1 is less than the predetermined first threshold Vth1 (Vdet1<Vth1) (No at step S102), the process returns to the processing at step S101 and repeats the processing starting at step S101.

When the detection signal Vdet1 is equal to or greater than the predetermined first threshold Vth1 (Vdet1≥Vth1) (Yes at step S102), the first touch IC 21 outputs the output signal Vout1 as a result of the detection and also outputs the detection synchronization signal SS1 to the second touch IC 22 and the detection synchronization signal SS2 to the third touch IC 23 (step S103).

Subsequently, the second touch IC 22 performs a mutual capacitive touch detection operation based on the detection synchronization signal SS1 for the second touch IC 22. The second touch IC 22 acquires the detection signal Vdet2 (step S104), and determines whether the detection signal Vdet2 is equal to or greater than a predetermined second threshold Vth2 (Vdet2≥Vth2) (step S105).

When the detection signal Vdet2 is equal to or greater than the predetermined second threshold Vth2 (Vdet2≥Vth2) (Yes at step S105), the second touch IC 22 outputs the output signal Vout2 as a result of the detection (step S106), and the process returns to the processing at step S101 and repeats the processing starting at step S101.

When the detection signal Vdet2 is less than the predetermined second threshold Vth2 (Vdet2<Vth2) (No at step S105), the process returns to the processing at step S101 and repeats the processing starting at step S101.

The third touch IC 23 performs electromagnetic-induction touch detection operation based on the detection synchronization signal SS2 for the third touch IC 23. The third touch IC 23 acquires the detection signal Vdet3 (step S107), and determines whether the detection signal Vdet3 is equal to or greater than a predetermined third threshold Vth3 (Vdet3≥Vth3) (step S108).

When the detection signal Vdet3 is less than the predetermined third threshold Vth3 (Vdet3<Vth3) (No at step S108), the process returns to the processing at step S101 and repeats the processing starting at step S101.

When the detection signal Vdet3 is equal to or greater than the predetermined third threshold Vth3 (Vdet3≥Vth3) (Yes at step S108), the third touch IC 23 outputs an output signal Vout3 as a result of the detection (step S109), and the process returns to the processing at step S101 and repeats the processing starting at step S101.

As described above, the display device 1 according to the first embodiment includes the display panel 10, the driver IC 11 configured to perform image display on the display panel 10, and the plurality of touch ICs (the first touch IC 21, the second touch IC 22, and the third touch IC 23). One (the first touch IC 21) of the touch ICs (the first touch IC 21, the second touch IC 22, and the third touch IC 23) is driven based on a synchronization signal that is output from the driver IC 11 and outputs a synchronization signal for any other touch IC (the second touch IC 22, the third touch IC 23). The other touch IC (the second touch IC 22, the third touch IC 23) is driven based on the synchronization signal that is output from the one touch IC (first touch IC 21).

Alternatively, the display device 1 according to the first embodiment includes the display panel 10, the driver IC 11 configured to perform image display on the display panel 10, and at least the first detection circuit (first touch IC 21), the second detection circuit (second touch IC 22), and the third detection circuit (third touch IC 23). The first detection circuit (first touch IC 21) is driven based on a synchronization signal that is output from the driver IC 11 and outputs respective synchronization signals for the second detection circuit (second touch IC 22) and the third detection circuit (third touch IC 23). The second detection circuit (second touch IC 22) and the third detection circuit (third touch IC 23) are driven based on the respective synchronization signals that are output from the first detection circuit (first touch IC 21).

With the above-described configuration, the number of wiring lines of the driver IC 11 can be reduced. In addition, touch detection control by the driver IC 11 can be simplified.

According to the present embodiment, the display device 1 that can prevent increase of the number of wiring lines and complication of control due to mounting of a plurality of touch ICs can be obtained.

Second Embodiment

Figure 9:
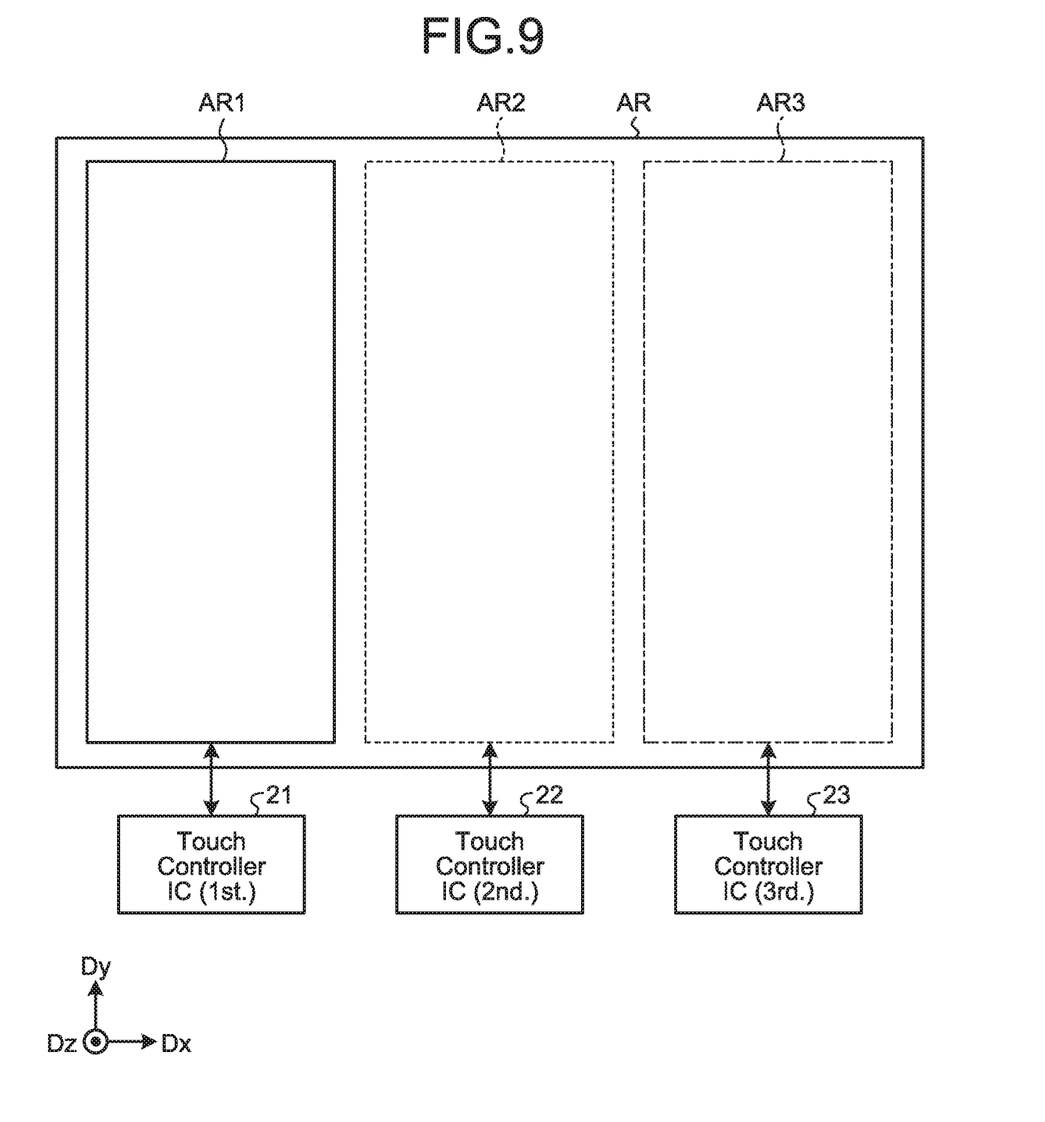
FIG. 9 is a pattern diagram illustrating the detection regions of respective touch ICs in a display device according to a second embodiment.

FIG. 9 is a pattern diagram illustrating the detection regions of respective touch ICs in in a display device according to a second embodiment. The display device according to the second embodiment has a schematic configuration the same as that in the first embodiment, but the present embodiment is different from the first embodiment in that the first touch IC 21, the second touch IC 22, and the third touch IC 23 perform touch detection operations by touch detection methods identical to each other.

In the present embodiment, as illustrated in FIG. 9, the detection region AR1 of the first touch IC 21, the detection region AR2 of the second touch IC 22, and the detection region AR3 of the third touch IC 23 are regions obtained by dividing the display region AR for display operations into three. That is, in the present embodiment, the first touch IC 21, the second touch IC 22, and the third touch IC 23 perform touch detection operations by touch detection methods identical to each other in the detection regions AR1, AR2, and AR3, respectively, which are obtained by dividing the display region AR into three. In other words, the first touch IC 21, the second touch IC 22, and the third touch IC 23 respectively perform touch detection operations in the detection regions AR1, AR2, and AR3 obtained by dividing the display region AR.

The touch detection methods of the first touch IC 21, the second touch IC 22, and the third touch IC 23 may be, for example, the electromagnetic induction method, the self-capacitive method, or the mutual capacitive method. The present disclosure is not limited by the embodiment of the touch detection method of the first touch IC 21, the second touch IC 22, and the third touch IC 23.

Figure 10:
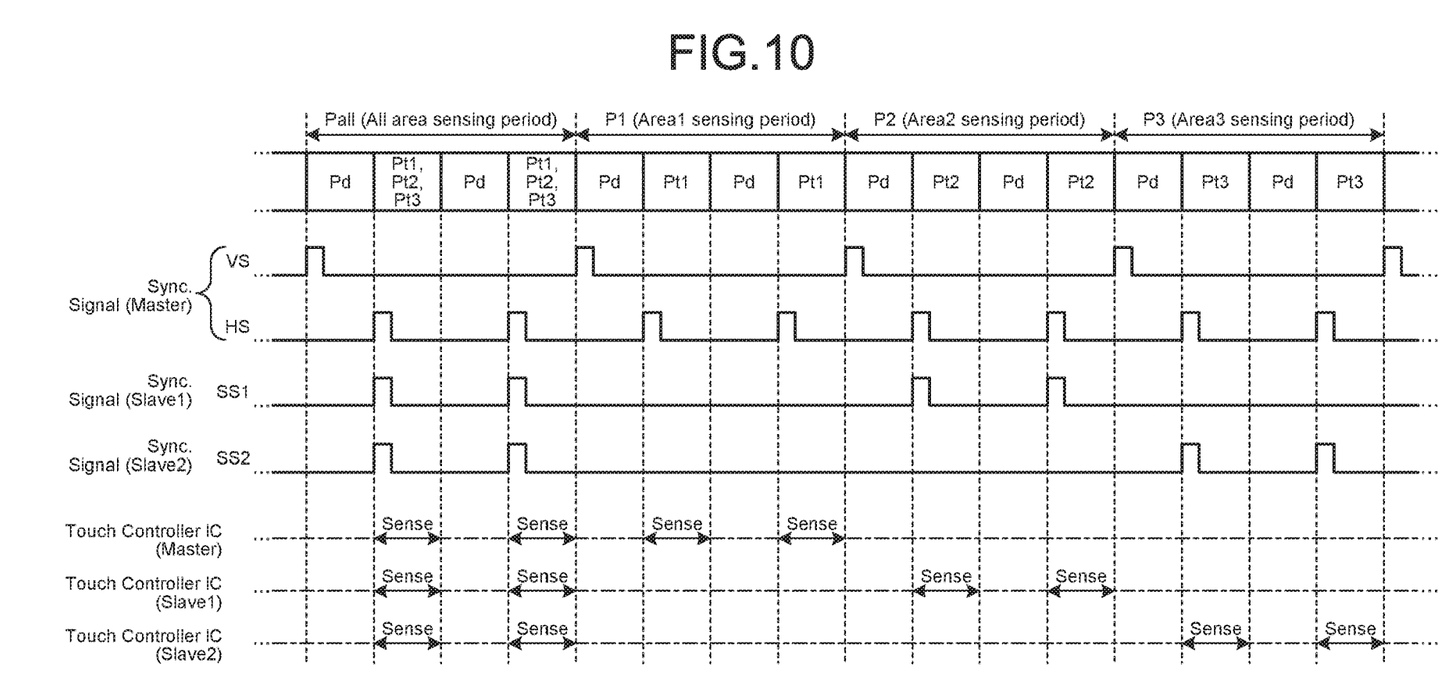
FIG. 10 is a timing chart illustrating an exemplary operation period of the display device according to the second embodiment.

FIG. 10 is a timing chart illustrating an exemplary operation period of the display device according to the second embodiment.

In the second embodiment, the first touch IC 21 changes a detection region in which touch detection is performed for each frame period in display operations, in other words, each cycle of the vertical synchronization signal VS.

Specifically, for example, as illustrated in FIG. 10, the first touch IC 21 holds a period Pall in which touch detection is performed in all detection regions AR1, AR2, and AR3, a period P1 in which touch detection is performed in the detection region AR1, a period P2 in which touch detection is performed in the detection region AR2, and a period P3 in which touch detection is performed in the detection region AR3.

In other words, in the period Pall, the first touch IC 21 performs touch detection in the detection region AR1, the second touch IC 22 performs touch detection in the detection region AR2, and the third touch IC 23 performs touch detection in the detection region AR3. In the period P1 following the period Pall, the first touch IC 21 performs touch detection in the detection region AR1. In the period P2 following the period P1, the second touch IC 22 performs touch detection in the detection region AR2. In the period P3 following the period P2, the third touch IC 23 performs touch detection in the detection region AR3.

Figure 11:
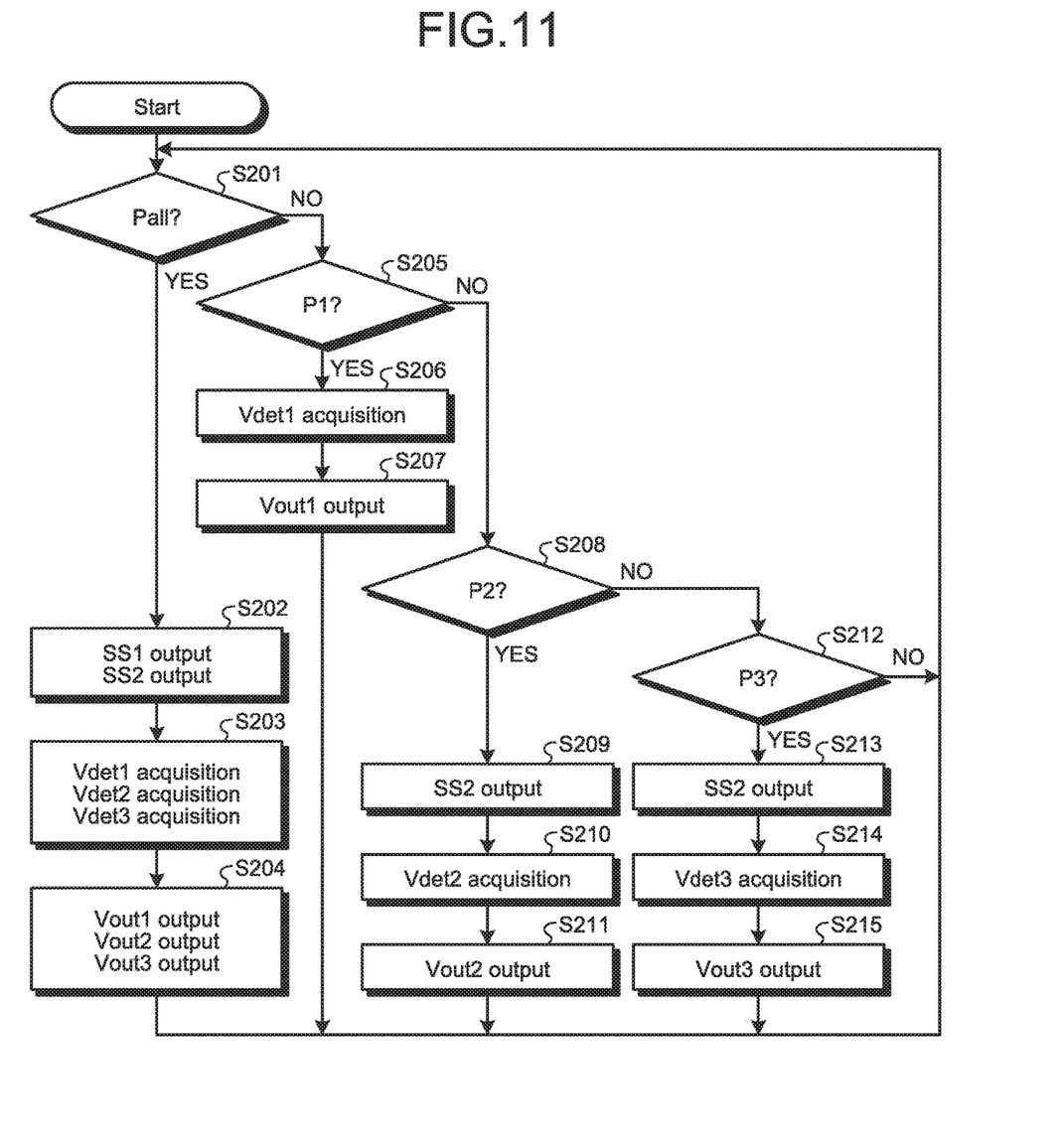
FIG. 11 is a flowchart illustrating exemplary processing performed by the display device according to the second embodiment.

The following describes processing according to the second embodiment with reference to FIGS. 10 and 11. FIG. 11 is a flowchart illustrating exemplary processing performed by the display device according to the second embodiment.

First, the first touch IC 21 determines which region is to be subject to touch detection. The first touch IC 21 determines whether the operation period is the period Pall in which touch detection is performed in all detection regions AR1, AR2, and AR3 (step S201).

When the operation period is the period Pall (Yes at step S201), the first touch IC 21 outputs the detection synchronization signal SS1 to the second touch IC 22 and outputs the detection synchronization signal SS2 to the third touch IC 23 (step S202).

The first touch IC 21 acquires the detection signal Vdet1, the second touch IC 22 acquires the detection signal Vdet2, and the third touch IC 23 acquires the detection signal Vdet3 (step S203).

The first touch IC 21 outputs the output signal Vout1 as a detection result, the second touch IC 22 outputs the output signal Vout2 as a detection result, and the third touch IC 23 outputs the output signal Vout3 as a detection result, and then the process returns to the processing at step S201 to repeat the processing starting at step S201.

When the detection signal Vdet1 is equal to or greater than the predetermined first threshold Vth1 (Vdet1≥Vth1) (Yes at step S102), the first touch IC 21 outputs the output signal Vout1 as a detection result and also outputs the detection synchronization signal SS1 to the second touch IC 22 and the detection synchronization signal SS2 to the third touch IC 23 (step S103).

When the operation period is not the period Pall (No at step S201), the first touch IC 21 determines whether the operation period is the period P1 in which touch detection is performed in the detection region AR1 (step S205).

When the operation period is the period P1 (Yes at step S205), the first touch IC 21 acquires the detection signal Vdet1 (step S206) and outputs the output signal Vout1 as a detection result (step S207), and then the process returns to the processing at step S201 to repeat the processing starting at step S201.

When the operation period is not the period P1 (No at step S205), it is determined whether the operation period is the period P2 in which touch detection is performed in the detection region AR2 (step S208).

When the operation period is the period P2 (Yes at step S208), the first touch IC 21 outputs the detection synchronization signal SS1 to the second touch IC 22 (step S209). The second touch IC 22 acquires the detection signal Vdet2 (step S210) and outputs the output signal Vout2 as a detection result (step S211), and then the process returns to the processing at step S201 to repeat the processing starting at step S201.

When the operation period is not the period P2 (No at step S208), it is determined whether the operation period is the period P3 in which touch detection is performed in the detection region AR3 (step S212).

When the operation period is the period P3 (Yes at step S212), the first touch IC 21 outputs the detection synchronization signal SS2 to the third touch IC 23 (step S213). The third touch IC 23 acquires the detection signal Vdet3 (step S214) and outputs the output signal Vout3 as a detection result (step S215), and then the process returns to the processing at step S201 to repeat the processing starting at step S201.

When the operation period is not the period P3 (No at step S212), the process returns to the processing at step S201 to repeat the processing starting at step S201.

In the example described in the present embodiment, the period Pall, in which the first touch IC 21, the second touch IC 22, and the third touch IC 23 perform detection operations at timings identical to each other, and the periods P1, P2, and P3, in which the first touch IC 21, the second touch IC 22, and the third touch IC 23 perform detection operations at timings different from each other, are provided in mixture. However, the first touch IC 21, the second touch IC 22, and the third touch IC 23 may perform detection operation at timings identical to each other in all detection periods, or the first touch IC 21, the second touch IC 22, and the third touch IC 23 may perform detection operations at timings different from each other in all detection periods. The present disclosure is not limited by the detection timings of the first touch IC 21, the second touch IC 22, and the third touch IC 23.

According to the present embodiment, the display device 1 that can prevent increase of the number of wiring lines and complication of control due to mounting of a plurality of touch ICs can be obtained.

In the example described above in the second embodiment, the first touch IC 21, the second touch IC 22, and the third touch IC 23 perform touch detection operations by touch detection methods identical to each other. However, for example, self-capacitive touch detection may be performed in the period Pall in which touch detection is performed in all detection regions AR1, AR2, and AR3, and mutual capacitive touch detection may be performed in a detection region in which contact with or proximity to the display surface by a detection target has been detected in the period Pall. In this case, for example, mutual capacitive touch detection may be performed in a detection region in which a detection signal in self-capacitive touch detection has been equal to or greater than a predetermined threshold in the period Pall.

Preferable embodiments of the present invention are described above, but the present invention is not limited to such embodiments. Contents disclosed in the embodiments are merely exemplary, and various kinds of modifications are possible without departing from the gist of the present invention. Any modification performed as appropriate without departing from the gist of the present invention belongs to the technical scope of the present invention.

In addition, the present invention may have configurations as follows.

(1) A display device comprising:
 a display panel;
 a driver IC configured to perform image display on the display panel; and
 a plurality of touch ICs, wherein
 one of the touch ICs is configured to be driven based on a synchronization signal that is output from the driver IC, and output a synchronization signal for another touch IC, and
 the other touch IC is configured to be driven based on a synchronization signal that is output from the one touch IC.
(2) The display device according to (1), wherein the touch ICs each perform a detection operation in a display region of the display panel as one detection region.
(3) The display device according to (2), wherein, when a detected value of one of the touch ICs is equal to or greater than a predetermined threshold, a touch IC other than the one of the touch ICs performs the detection operation.
(4) The display device according to (1), wherein the touch ICs perform touch detection operations by touch detection methods different from each other.
(5) The display device according to (1), wherein the touch ICs each perform a detection operation for its respective detection region obtained by dividing a display region of the display panel.
(6) The display device according to (5), wherein the touch ICs perform the detection operation at timings identical to each other.
(7) The display device according to (5), wherein the touch ICs perform the detection operation at timings different from each other.
(8) The display device according to (1), wherein a display period in which image display is performed on the display panel and a detection period in which at least one of the touch ICs performs a detection operation, are provided in a time divisional manner.
(9) The display device according to (2), wherein
 the touch ICs include a first touch IC, a second touch IC, and a third touch IC,
 when a detected value of the first touch IC is equal to or greater than a predetermined first threshold, the second touch IC performs a detection operation, and
 when a detected value of the second touch IC is equal to or greater than a predetermined second threshold, the third touch IC performs a detection operation.
(10) The display device according to (5), wherein
 the touch ICs include a first touch IC, a second touch IC, and a third touch IC,
 in a first period, the first touch IC, the second touch IC, and the third touch IC perform the detection operations,
 in a second period following the first period, the first touch IC performs the detection operation,
 in a third period following the second period, the second touch IC performs the detection operation, and
 in a fourth period following the third period, the third touch IC performs the detection operation.
(11) A display device comprising:
 a display panel;
 a driver IC configured to perform image display on the display panel; and
 at least a first detection circuit, a second detection circuit, and a third detection circuit, wherein
 the first detection circuit is configured to be driven based on a synchronization signal that is output from the driver IC, and output respective synchronization signals for the second detection circuit and the third detection circuit, and
 the second detection circuit and the third detection circuit are configured to be driven based on the respective synchronization signals that are output from the first detection circuit.
(12) The display device according to (11), wherein the first detection circuit, the second detection circuit, and the third detection circuit each perform a detection operation in a display region of the display panel as one detection region.
(13) The display device according to (12), wherein, when a detected value of one of the first detection circuit, the second detection circuit, and the third detection circuit is equal to or greater than a predetermined threshold, detection circuits other than the one detection circuit among the first detection circuit, the second detection circuit, and the third detection circuit perform the detection operation.
(14) The display device according to (11), wherein the first detection circuit, the second detection circuit, and the third detection circuit perform touch detection operations by touch detection methods different from each other.

(15) The display device according to (11), wherein the first detection circuit, the second detection circuit, and the third detection circuit each perform a detection operation for its respective detection region obtained by dividing a display region of the display panel.

(16) The display device according to (15), wherein the first detection circuit, the second detection circuit, and the third detection circuit perform the detection operation at timings identical to each other.

(17) The display device according to (15), wherein the first detection circuit, the second detection circuit, and the third detection circuit perform the detection operation at timings different from each other.

(18) The display device according to (11), wherein a display period in which image display is performed on the display panel and a detection period in which at least one from among the first detection circuit, the second detection circuit, and the third detection circuit performs a detection operation, are provided in a time divisional manner.

(19) The display device according to (12), wherein
when a detected value of the first detection circuit is equal to or greater than a predetermined first threshold, the second detection circuit performs the detection operation, and
when a detected value of the second detection circuit is equal to or greater than a predetermined second threshold, the third detection circuit performs the detection operation.

(20) The display device according to (15), wherein
in a first period, the first detection circuit, the second detection circuit, and the third detection circuit each perform the detection operation,
in a second period following the first period, the first detection circuit performs the detection operation,
in a third period following the second period, the second detection circuit performs the detection operation, and
in a fourth period following the third period, the third detection circuit performs the detection operation.

The invention claimed is:

1. A display device comprising:
a display panel;
a driver IC configured to perform image display on the display panel; and
a plurality of touch ICs, wherein
one of the touch ICs is configured to be driven based on a synchronization signal that is output from the driver IC, and output a synchronization signal for another touch IC,
the other touch IC is configured to be driven based on a synchronization signal that is output from the one touch IC, and
the touch ICs perform touch detection operations by touch detection methods different from each other.

2. The display device according to claim 1, wherein the touch ICs each perform a detection operation in a display region of the display panel as one detection region.

3. The display device according to claim 2, wherein, when a detected value of one of the touch ICs is equal to or greater than a predetermined threshold, a touch IC other than the one of the touch ICs performs the detection operation.

4. The display device according to claim 1, wherein the touch ICs each perform a detection operation for its respective detection region obtained by dividing a display region of the display panel.

5. The display device according to claim 4, wherein the touch ICs perform the detection operation at timings identical to each other.

6. The display device according to claim 4, wherein the touch ICs perform the detection operation at timings different from each other.

7. The display device according to claim 1, wherein a display period in which image display is performed on the display panel and a detection period in which at least one of the touch ICs performs a detection operation, are provided in a time divisional manner.

8. The display device according to claim 2, wherein
the touch ICs include a first touch IC, a second touch IC, and a third touch IC,
when a detected value of the first touch IC is equal to or greater than a predetermined first threshold, the second touch IC performs the detection operation, and
when a detected value of the second touch IC is equal to or greater than a predetermined second threshold, the third touch IC performs the detection operation.

9. The display device according to claim 4, wherein
the touch ICs include a first touch IC, a second touch IC, and a third touch IC,
in a first period, the first touch IC, the second touch IC, and the third touch IC each perform the detection operation,
in a second period following the first period, the first touch IC performs the detection operation,
in a third period following the second period, the second touch IC performs the detection operation, and
in a fourth period following the third period, the third touch IC performs the detection operation.

10. A display device comprising:
a display panel;
a driver IC configured to perform image display on the display panel; and
at least a first detection circuit, a second detection circuit, and a third detection circuit, wherein
the first detection circuit is configured to be driven based on a synchronization signal that is output from the driver IC, and output respective synchronization signals for the second detection circuit and the third detection circuit,
the second detection circuit and the third detection circuit are configured to be driven based on the respective synchronization signals that are output from the first detection circuit,
and the first detection circuit, the second detection circuit, and the third detection circuit perform touch detection operations by touch detection methods different from each other.

11. The display device according to claim 10, wherein the first detection circuit, the second detection circuit, and the third detection circuit each perform a detection operation in a display region of the display panel as one detection region.

12. The display device according to claim 11, wherein, when a detected value of one of the first detection circuit, the second detection circuit, and the third detection circuit is equal to or greater than a predetermined threshold, detection circuits other than the one detection circuit among the first detection circuit, the second detection circuit, and the third detection circuit the perform detection operation.

13. The display device according to claim 10, wherein the first detection circuit, the second detection circuit, and the third detection circuit each perform a detection operation for its respective detection region obtained by dividing a display region of the display panel.

14. The display device according to claim 13, wherein the first detection circuit, the second detection circuit, and the third detection circuit perform the detection operation at timings identical to each other.

15. The display device according to claim 13, wherein the first detection circuit, the second detection circuit, and the third detection circuit perform the detection operation at timings different from each other.

16. The display device according to claim 10, wherein a display period in which image display is performed on the display panel and a detection period in which at least one from among the first detection circuit, the second detection circuit, and the third detection circuit performs a detection operation, are provided in a time divisional manner.

17. The display device according to claim 11, wherein
when a detected value of the first detection circuit is equal to or greater than a predetermined first threshold, the second detection circuit performs the detection operation, and
when a detected value of the second detection circuit is equal to or greater than a predetermined second threshold, the third detection circuit performs the detection operation.

18. The display device according to claim 13, wherein
in a first period, the first detection circuit, the second detection circuit, and the third detection circuit each perform the detection operation,
in a second period following the first period, the first detection circuit performs the detection operation,
in a third period following the second period, the second detection circuit performs the detection operation, and
in a fourth period following the third period, the third detection circuit performs the detection operation.

* * * * *